United States Patent
Huang et al.

(10) Patent No.: US 9,883,188 B2
(45) Date of Patent: Jan. 30, 2018

(54) IMAGE COMPRESSION SYSTEM FOR DYNAMICALLY ADJUSTING COMPRESSION PARAMETERS BY CONTENT SENSITIVE DETECTION IN VIDEO SIGNAL

(71) Applicant: FocalTech Systems Co., Ltd., Hsinchu (TW)

(72) Inventors: Cheng-Pin Huang, Hsinchu (TW); Ya-Chen Huang, Hsinchu (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 292 days.

(21) Appl. No.: 14/722,394

(22) Filed: May 27, 2015

(65) Prior Publication Data
US 2015/0350655 A1 Dec. 3, 2015

(30) Foreign Application Priority Data
May 27, 2014 (TW) .............................. 103118365 A

(51) Int. Cl.
*H04N 19/176* (2014.01)
*H04N 19/154* (2014.01)
*H04N 19/146* (2014.01)
*H04N 19/124* (2014.01)
*H04N 19/14* (2014.01)

(52) U.S. Cl.
CPC ......... *H04N 19/146* (2014.11); *H04N 19/124* (2014.11); *H04N 19/14* (2014.11); *H04N 19/154* (2014.11); *H04N 19/176* (2014.11)

(58) Field of Classification Search
None
See application file for complete search history.

(56) References Cited

U.S. PATENT DOCUMENTS

| 2007/0104272 | A1* | 5/2007 | He | H04N 19/176 |
| | | | | 375/240.12 |
| 2013/0279563 | A1* | 10/2013 | Li | H04N 19/115 |
| | | | | 375/240.02 |
| 2014/0072034 | A1* | 3/2014 | Tanner | H04N 19/139 |
| | | | | 375/240.03 |
| 2015/0039779 | A1* | 2/2015 | Lu | H04N 19/60 |
| | | | | 709/231 |

(Continued)

*Primary Examiner* — Reza Aghevli
(74) *Attorney, Agent, or Firm* — Bacon & Thomas, PLLC

(57) ABSTRACT

An image compression system includes a register, a sensitive detection device, a prediction difference device, a bit-rate control device, a mapping device, and an encoding device, The register temporarily stores plural pixels, which have a current encoding pixel and plural historical decoded pixels. The sensitive detection device analyzes contents of the historical decoded pixels or a previous history data to calculate a prediction value and a current history data. The prediction difference device subtracts the prediction value from the current encoding pixel to generate a prediction difference value. The bit-rate control device adjusts a compression ratio according to a final bits signal so as to output a suggestion bits signal. The mapping device outputs an index based on the prediction difference value, the current history data, and the suggestion bits signal. The encoding device encodes the index to output a bit stream and the final bits signal.

21 Claims, 10 Drawing Sheets

(56) References Cited

U.S. PATENT DOCUMENTS

| | | | | |
|---|---|---|---|---|
| 2015/0063461 A1* | 3/2015 | Zheng | ............... | H04N 19/176 375/240.24 |
| 2015/0296209 A1* | 10/2015 | Thirumalai | ......... | H04N 19/115 375/240.18 |
| 2015/0296210 A1* | 10/2015 | Thirumalai | ............ | H04N 19/19 375/240.18 |
| 2015/0304675 A1* | 10/2015 | Jacobson | ............. | H04N 19/50 375/240.12 |
| 2016/0044317 A1* | 2/2016 | Thirumalai | ......... | H04N 19/152 375/240.26 |
| 2016/0134870 A1* | 5/2016 | Lu | .................. | H04N 19/147 375/240.03 |
| 2016/0301933 A1* | 10/2016 | Jacobson | ............. | H04N 19/14 |
| 2016/0301950 A1* | 10/2016 | Jacobson | ............. | H04N 19/593 |
| 2016/0309139 A1* | 10/2016 | Shiozaki | ............... | G03B 35/08 |
| 2016/0309149 A1* | 10/2016 | Thirumalai | ......... | H04N 19/176 |

* cited by examiner

```
if( abs(y4*2-y3-y5)<Threshold1), then
    predict-value =interpolation;
else if (max(abs( y1 - y2), abs( y2 - y3), abs( y3 - y4)) > Threshold2 ), then
    predict-value = mode;
else
    predict-value =median;
```

FIG. 3

```
e_v=abs(y2-y3); e1=abs(y6-y3);e2=abs(y1-y3);
if(e1<e_v && e1<e2) then,
   prediction value = y2;
if(e2<e_v) then,
   prediction value = y7;
else then,
   prediction value = y1;
```

FIG. 5

```
tmp = bits_target - final_bits;
res += tmp;
res_t = ( res>128) ? (res-128)/64 + 128: res;
suggest_bits = res_t + bits_target;
```

FIG. 6 if( max( abs(X - X1), abs(X1 - X2), ..., abs(X15 - X16)) <TH) then block size = 16 (header number11)
else if ( max( abs(X - X1), abs(X1 - X2), ..., abs(X7 - X8)) <TH) then block size = 8(header number10)
else if ( max( abs(X - X1), abs(X1 - X2), ..., abs(X3 - X4)) <TH) then block size = 4(header number01)
else block size = 1(header number00)

FIG. 9 index0 = dif0/(2^QP[0]),
index1 = dif1/(2^QP[1]),
index2 = dif2/(2^QP[2])
index3 = dif3/(2^QP[3])
FIG. 11
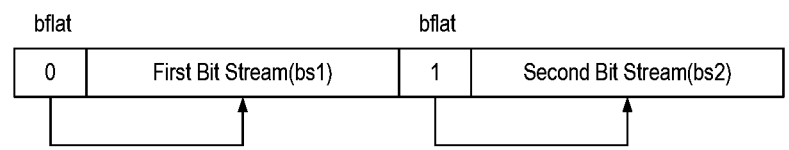
FIG. 12
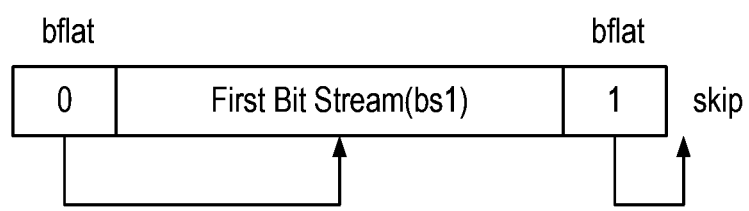
FIG. 13

IMAGE COMPRESSION SYSTEM FOR DYNAMICALLY ADJUSTING COMPRESSION PARAMETERS BY CONTENT SENSITIVE DETECTION IN VIDEO SIGNAL

BACKGROUND OF THE INVENTION

1. Field of the Invention

The present invention relates to the technical field of image compression and, more particularly, to an image compression system for dynamically adjusting compression parameters by content sensitive detection in video signal.

2. Description of Related Art

With the rapid advance of electronics technologies and transmission techniques, the requirement for image quality in browsing is getting higher. Because the size of image data is usually huge, the image data is typically compressed for then being transferred to the Internet or stored in a hard disk. With image compression techniques, the memory space occupied by image data can be saved and the speed of transmission can thus be increased. Therefore, the image compression is currently very popular on research.

In March, 2003, the video compression standard H.264 is formally published by the ITU-T/ISO, which is known as a new-generation video encoding standard with an excellent performance in comparison with the previously used standard. Specially, as compared with H.263 or MPEG-4 on the same quality, the number of code rates can be reduced to half or, for the same code rate, the peak signal to noise ratio (PSNR) is significantly increased.

However, for the field of image display applications, the panel resolution is increased from the earliest QCIF (Quarter Common Intermediate Format) to ¼ high definition (Quarter High Definition, qHD) or even up to full high definition (Full HD) or 4K2K. Accordingly, in case that there is no suitable compression or other technique provided at the front-end, the power, bandwidth and timing rate required for data transmission are inevitably increased.

For increasing the compression efficiency, H.264 video compression standard provides a variable block size in inter coding. In the prior art, such as U.S. Pat. No. 5,021,891 granted to Lee for an "Adaptive block size image compression method and system", it is based on the magnitude of an image texture change to determine how to segment the 16×16 block used in a current compression. However, in a hardware implementation, such technique has to first test multiple sizes of blocks in parallel and estimate the number of bits required for each combination, and then determine the segmentation on the blocks. Thus, the hardware cost is too high and thus it is not appropriate for a hardware implementation of real-time compression/decompression.

Therefore, it is desirable to provide an improved image compression system to mitigate and/or obviate the aforementioned problems.

SUMMARY OF THE INVENTION

The object of the present invention is to provide an image compression system for dynamically adjusting compression parameters by content sensitive detection in video signal, which makes use of the previously generated history data in compression to predict the parameters, without having to analyze the data in a large block, so as to save the computation and reduce the related data stream and time delay thereby conforming to the real-time compression/decompression application.

According to a feature of the present invention, there is provided an image compression system for dynamically adjusting compression parameters by content sensitive detection in video signal, which encodes a plurality of pixels of a frame. The image compression system comprises: a register for temporarily storing the plurality of pixels of the frame, wherein the plurality of pixels have a current encoding pixel and a plurality of historical decoded pixels; a sensitive detection device connected to the register for analyzing contents of the plurality of historical decoded pixels or a previous history data so as to calculate a prediction value and a current history data for output; a prediction difference device connected to the sensitive detection device for subtracting the prediction value from the current encoding pixel so as to generate a prediction difference value for output; a bit-rate control device for adjusting a compression ratio according to a final bits signal so as to output a suggestion bits signal; a mapping device connected to the sensitive detection device, the prediction difference device, and the bit-rate control device for outputting an index based on the prediction difference value, the current history data, and the suggestion bits signal; and an encoding device connected to the mapping device and the bit-rate control device for encoding the index so as to output a bit stream and the final bits signal.

According to another feature of the present invention, there is provided an image compression system for dynamically adjusting compression parameters by content sensitive detection in video signal, which encodes a plurality of pixels of a frame. The image compression system comprises: a register for temporarily storing the plurality of pixels of the frame, the plurality of pixels having a current encoding pixel, a plurality of historical decoded pixels, and a plurality of uncoded pixels; a sensitive detection device connected to the register for detecting contents of the plurality of historical decoded pixels or analyzing a previous history data so as to calculate a prediction value and a current history data for output; a prediction difference device connected to the sensitive detection device for subtracting the prediction value from the current encoding pixel so as to generate a prediction difference value for output; a bit-rate control device for adjusting a compression ratio according to a final bits signal so as to output a suggestion bits signal; a mapping device connected to the sensitive detection device, the prediction difference device, and the bit-rate control device for calculating and outputting an index based on the current history data, the prediction difference value, and the suggestion bits signal; an encoding device connected to the mapping device and the bit-rate control device for encoding the index for outputting a first bit stream; a flatness detection device connected to the register for calculating a flatness of the current encoding pixel and a flatness indicative signal based on the current encoding pixel and the plurality of uncoded pixels; a flat-region encoding device connected to the prediction difference device for calculating and outputting a second bit stream based on a predetermined quantization parameter and the prediction difference value; and a multiplexer connected to the encoding device, the flatness detection device, and the flat-region encoding device for selecting one of the first and the second bit streams for output.

Other objects, advantages, and novel features of the invention will become more apparent from the following detailed description when taken in conjunction with the accompanying drawings.

BRIEF DESCRIPTION OF THE DRAWINGS

FIG. 3 schematically illustrates the pseudo code of an exemplary prediction value selection module according to the present invention;

FIG. 5 schematically illustrates the pseudo code of another exemplary prediction value selection module according to the present invention;

FIG. 6 schematically illustrates the pseudo code for fine adjusting a suggestion bits signal by a bit rate control device according to the present invention;

FIG. 9 schematically illustrates the pseudo code of determining a block size according to the present invention;

FIG. 11 schematically illustrates the functional pseudo code of the flat-region encoding device according to the present invention;

FIG. 12 schematically illustrates the bit stream outputted by a multiplexer according to the invention; and FIG. 13 schematically illustrates another output bit stream of a multiplexer according to the present invention.

DETAILED DESCRIPTION OF THE PREFERRED EMBODIMENT

Figure 1:
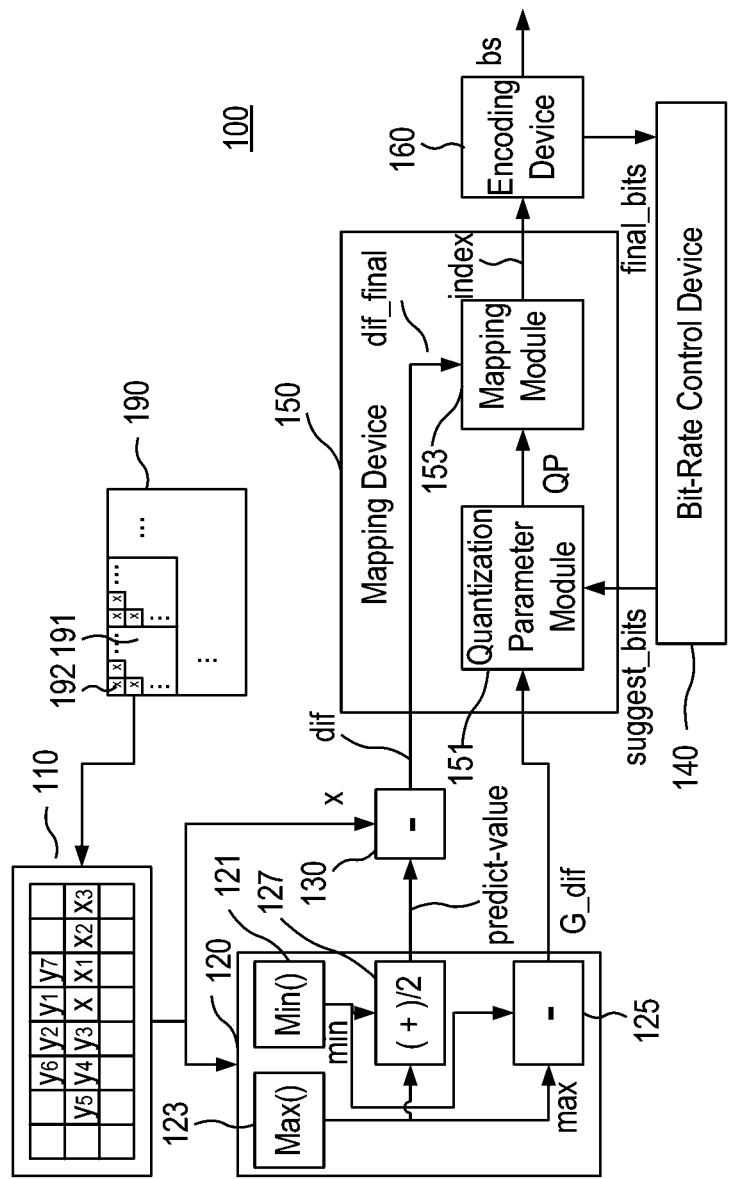
FIG. 1 is a block diagram of an image compression system for dynamically adjusting compression parameters by content sensitive detection in video signal according to an embodiment of the present invention.

FIG. 1 is a block diagram of an image compression system 100 for dynamically adjusting compression parameters by content sensitive detection in video signal according to an embodiment of the present invention. The image compression system 100 is provided to encode a plurality of pixels 192 of a frame 190. The frame 190 has a plurality of blocks arranged in a matrix form, and each block has a plurality of pixels 192 arranged as a 16×8, 8×16, 8×8, 8×4, 4×8, or 4×4 matrix. The image compression system 100 includes a register 110, a sensitive detection device 120, a prediction difference device 130, a bit-rate control device 140, a mapping device 150, and an encoding device 160.

The register 110 temporarily stores the plurality of pixels 192 of the frame 190. The plurality of pixels 192 include a current encoding pixel (x), a plurality of historical decoded pixels, and a plurality of uncoded pixels. The historical decoded pixels include first to seventh historical decoded pixels (y1-y7). The first historical decoded pixel (y1) is disposed at the upper pixel position of the current encoding pixel (x). The second historical decoded pixel (y2) is disposed at the upper left pixel position of the current encoding pixel (x). The third historical decoded pixel (y3) is disposed at the left pixel position of the current encoding pixel (x). The fourth historical decoded pixel (y4) is disposed at the second-to-left pixel position of the current encoding pixel (x), i.e., the left pixel position of the pixel (y3). The fifth historical decoded pixel (y5) is disposed at the third-to-left pixel position of the current encoding pixel (x), i.e., the left pixel position of the pixel (y4). The sixth historical decoded pixel (y6) is disposed at the upper second-to-left pixel position of the current encoding pixel (x), i.e., the upper left pixel position of the pixel (y3). The seventh historical decoded pixel (y7) is disposed at the upper right pixel position of the current encoding pixel (x). In the present invention, the historical decoded pixels represent those pixels in the frame that have been correspondingly encoded and then decoded, such that the data used in the image compression system 100 is consistent with the decoded data at a receiver (not shown).

The plurality of uncoded pixels include first to third uncoded pixels (x1-x3). The first uncoded pixel (x1) is disposed at the right pixel position of the current encoding pixel (x). The second uncoded pixel (x2) is disposed at the second-to-right pixel position of the current encoding pixel (x), i.e., the right pixel position of the pixel (x1). The third uncoded pixel (x3) is disposed at the third-to-right pixel position of the current encoding pixel (x), i.e., the right pixel position of the pixel (x2).

The sensitive detection device 120 is connected to the register 110 for detecting contents of the plurality of historical decoded pixels or analyzing a previous history data so as to generate a prediction value (predict-value) and a current history data (G_dif) for output. The current history data (G_dif) indicates the image complexity of the plurality of historical decoded pixels.

The sensitive detection device 120 includes a minimum value module 121, a maximum value module 123, a difference value module 125, and an average value module 127. The minimum value module 121 is connected to the register 110 for receiving the plurality of historical decoded pixels and outputting a minimum value of the plurality of historical decoded pixels. The maximum value module 123 is connected to the register 110 for receiving the plurality of historical decoded pixels and outputting a maximum value of the plurality of historical decoded pixels. The difference value module 125 is connected to the minimum value module 121 and the maximum value module 123 for calculating a difference value of the minimum value and the maximum value, so as to generate the current history data (G_dif). The average value module 127 is connected to the minimum value module 121 and the maximum value module 123 for calculating an average value of the minimum value and the maximum value, so as to generate the prediction value (predict-value).

In this embodiment, the first to fourth historical decoded pixels (y1, y2, y3, y4) of the plurality of historical decoded pixels are used. That is, the minimum value module 121 is connected to the register 110 for receiving the first to fourth historical decoded pixels (y1, y2, y3, y4) and outputting the minimum value (min) of the first to fourth historical decoded pixels (y1, y2, y3, y4). Namely, the minimum value (min) can be expressed as follows:

$$\text{min}=\text{Min}(y1,y2,y3,y4).$$

The maximum value module 123 is connected to the register 110 for receiving the first to fourth historical decoded pixels (y1, y2, y3, y4) and outputting the maximum value (max) of the first to fourth historical decoded pixels (y1, y2, y3, y4). Namely, the maximum value (max) can be expressed as follows:

$$\text{max}=\text{Max}(y1,y2,y3,y4).$$

The difference value module 125 is connected to the minimum value module 121 and the maximum value module 123 for calculating the difference value of the minimum value (min) and the maximum value (max), so as to generate the current history data (G_dif). Namely, the current history data (G_dif) can be expressed as follows:

G_dif=max−min

The average value module 127 is connected to the minimum value module 121 and the maximum value module 123 for calculating the average value of the minimum value (min) and the maximum value (max). so as to generate the prediction value (predict-value). Namely, the prediction value (predict-value) can be expressed as follows:

predict-value=(max+min)/2.

Figure 2:
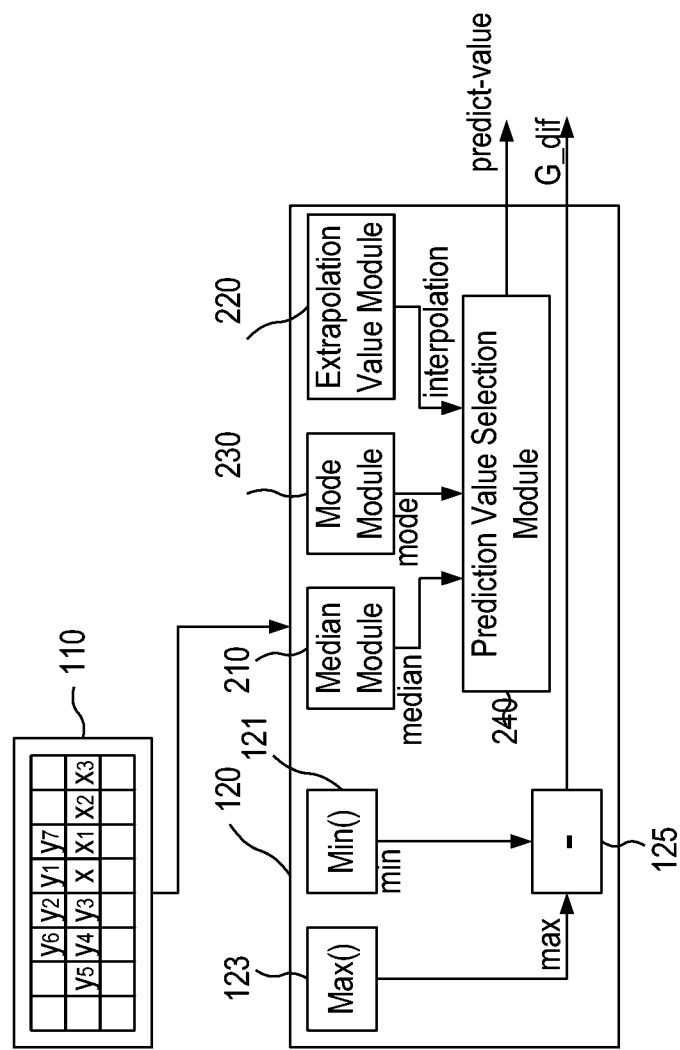
FIG. 2 is a schematic diagram of another example of the sensitive detection device according to the present invention.

FIG. 2 is a schematic diagram of another example of the sensitive detection device 120 according to the invention. The sensitive detection device 120 includes a minimum value module 121, a maximum value module 123, a difference value module 125, a median value module 210, an extrapolation value module 220, a mode module 230, and a prediction value selection module 240.

The minimum value module 121, the maximum value module 123, and the difference value module 125 are similar to those of FIG. 1, except that the operation is performed to the first to fifth historical decoded pixels (y1, y2, y3, y4, y5), i.e., G_dif=Max(y1, y2, y3, y4, y5)−Min(y1, y2, y3, y4, y5), and thus a detailed description therefor is deemed unnecessary. The median value module 210 is connected to the register 110 for receiving the plurality of historical decoded pixels and outputting a median value of the plurality of historical decoded pixels. The extrapolation module 220 is connected to the register 110 for receiving the plurality of historical decoded pixels and outputting an extrapolation value of the plurality of historical decoded pixels. The mode module 230 is connected to the register 110 for receiving the plurality of historical decoded pixels and outputting a mode of the plurality of historical decoded pixels. The prediction value selection module 240 is connected to the median value module 210, the extrapolation value module 220, and the mode module 230 for selecting one of the median value, the extrapolation value, and the mode as the prediction value (predict-value).

In this example, as cited above, the first to fifth historical decoded pixels (y1, y2, y3, y4, y5) of the plurality of historical decoded pixels are used. Namely, the median value module 210 is connected to the register 110 for receiving the first to fifth historical decoded pixels (y1, y2, y3, y4, y5) and outputting the median value of the first to fifth historical decoded pixels.

The extrapolation value module 220 is connected to the register 110 for receiving the third to fifth historical decoded pixels (y3, y4, y5) and outputting an extrapolation value of the third to fifth historical decoded pixels. Since the third to fifth historical decoded pixels (y3, y4, y5) are disposed at the same row as the current encoding pixel (x), the third to fifth historical decoded pixels (y3, y4, y5) are used to perform an extrapolation operation.

The mode module 230 is connected to the register 110 for receiving the first to fifth historical decoded pixels (y1, y2, y3, y4, y5) and outputting a mode of the first to fifth decoded pixels.

The prediction value selection module 240 is connected to the median value module 210, the extrapolation value module 220, and the mode module 230 for selecting one of the median value, the extrapolation value, and the mode as the prediction value (predict-value).

FIG. 3 schematically illustrates the pseudo code of the prediction value selection module 240 according to the present invention, which can be converted into practical hardware by those skilled in the art using the Verilog or VHDL programming language based on the disclosure of the present invention. As shown in FIG. 3, when an absolute value of subtracting the third historical decoded pixel (y3) and the fifth historical decoded pixel (y5) from a double of the fourth historical decoded pixel (y4) is smaller than a first threshold (Threshold1), the prediction value selection module 240 selects the extrapolation value as the prediction value (predict-value). When the absolute value of subtracting the third historical decoded pixel (y3) and the fifth historical decoded pixel (y5) from a double of the fourth historical decoded pixel (y4) is smaller than the first threshold (Threshold1), it indicates that the third historical decoded pixel (y3), the fourth historical decoded pixel (y4), and the fifth historical decoded pixel (y5) present a linear variation and the amount of variation is small, so that the prediction value selection module 240 selects the extrapolation value as the prediction value (predict-value).

When a maximum one from an absolute value of subtracting the second historical decoded pixel (y2) from the first historical decoded pixel (y1), an absolute value of subtracting the third historical decoded pixel (y3) from the second historical decoded pixel (y2), and an absolute value of subtracting the fourth historical decoded pixel (y4) from the third historical decoded pixel (y3) is greater than a second threshold (Threshold2), the prediction value selection module 240 selects the mode as the prediction value (predict-value); otherwise, the prediction value selection module 240 selects the median as the prediction value (predict-value).

Figure 4:
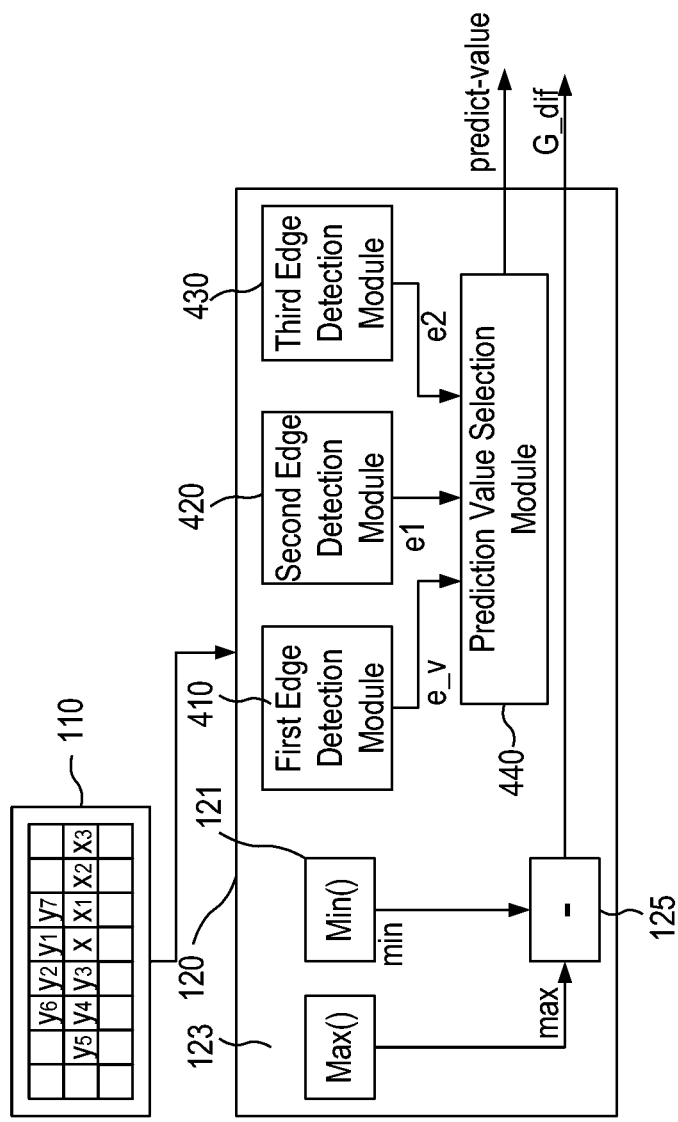
FIG. 4 is a schematic diagram of a further example of the sensitive detection device according to the present invention.

FIG. 4 is a schematic diagram of a further example of the sensitive detection device 120 according to the present invention. The sensitive detection device 120 makes use of edges to predict the predication value (predict-value). The sensitive detection device 120 includes a plurality of edge detection modules to generate a plurality of edge values for predicting the prediction value (predict-value). The sensitive detection device 120 includes a minimum value module 121, a maximum value module 123, a difference value module 125, a first edge detection module 410, a second edge detection module 420, a third edge detection module 430, and a prediction value selection module 440.

The minimum value module 121, the maximum value module 123, and the difference value module 125 are similar to those in FIG. 1, except that the operation is performed to the first to seventh historical decoded pixels (y1, y2, y3, y4, y5, y6, y7), i.e., G_dif=Max(y1, y2, y3, y4, y5, y6, y7)−Min(y1, y2, y3, y4, y5, y6, y7), and thus a detailed description therefor is deemed unnecessary. The first edge detection module 410 is connected to the register 110 for receiving the second and the third historical decoded pixels (y2, y3) so as to calculate an absolute value of a difference between the second and the third historical decoded pixels (y2, y3) and output the absolute value for use as a first edge value (e_v).

The second edge detection module 420 is connected to the register 110 for receiving the third and the sixth historical decoded pixels (y3, y6), so as to calculate an absolute value of a difference between the third and the sixth historical decoded pixels (y3, y6) and output the absolute value for use as a second edge value (e1).

The third edge detection module 430 is connected to the register 110 for receiving the third and the first historical decoded pixels (y3, y1), so as to calculate an absolute value of a difference between the third and the first historical decoded pixels (y3, y1) and output the absolute value for use as a third edge value (e2).

The prediction value selection module 440 is connected the first edge detection module 410, the second edge detection module 420, and the third edge detection module 430 for selecting one of the second historical decoded pixel y2, the seventh historical decoded pixel y7, and the first historical decoded pixel y1 as the prediction value (predict-value) according to the first edge value (e_v), the second edge value (e1), and the third edge value (e2).

FIG. 5 schematically illustrates the pseudo code of the prediction value selection module 440 according to the present invention. As shown in FIG. 5, when the second edge value (e1) is smaller than the first edge value (e_v) and the second edge value (e1) is smaller than the third edge value (e2), the prediction value selection module 440 selects the second historical decoded pixel (y2) as the predication value (predict-value). When the third edge value (e2) is smaller than the first edge value (e_v), the prediction value selection module 440 selects the seventh historical decoded pixel (y7) as the predication value (predict-value); otherwise, the prediction value selection module 440 selects the first historical decoded pixel (y1) as the predication value (predict-value).

The prediction difference device 130 is connected to the sensitive detection device 120 for subtracting the prediction value (predict-value) from the current encoding pixel (x) thereby generating a prediction difference value (dif) for output.

The bit-rate control device 140 adjusts a compression ratio according to a final bits signal (final_bits), so as to generate a suggestion bits signal (suggest_bits) for output. The bit-rate control device 140 provides the suggestion bits signal (suggest_bits) to the mapping device 150 for adjusting the compression ratio of each block of the frame, so as to enable the total compression ratios are consistent with the target.

When each pixel of the frame includes red (R), green (G), blue (B) colors and each color is represented by eight bits, i.e., each pixel having 24 bits, and when one block has a size of four pixels and a double compression is employed, the bits target (bits_target) of each block is 48 bits, i.e., bits_target=24*4/2=48 bits. The bit-rate control device 140 then makes use of the final bits signal to fine adjust the suggestion bits signal (suggest_bits). FIG. 6 schematically illustrates the pseudo code for fine adjusting the suggestion bits signal by the bit rate control device 140 according to the present invention. In FIG. 6, symbol "?" is a conditional operator, and the expression "d=a?b:c" indicates that d=b when a is true and d=c when a is not true.

With reference to FIG. 1 again, the mapping device 150 is connected to the sensitive detection device 120, the prediction difference device 130, and the bit-rate control device 140 for calculating and outputting an index based on the prediction difference value (dif), the current history data (G_dif), and the suggestion bits signal (suggest_bits). The mapping device 150 includes a quantization parameter (QP) module 151 and a mapping module 153.

The QP module 151 is connected to the sensitive detection device 120 and the bit-rate control device 140. The QP module 151 calculates a bit distribution (bpc) based on the suggestion bits signal (suggest_bits) and the number of color pixels in a block containing the current encoding pixel (x), and further calculates a quantization parameter (QP) based on the current history data (G_dif) and the bit distribution (bpc).

Figure 7:
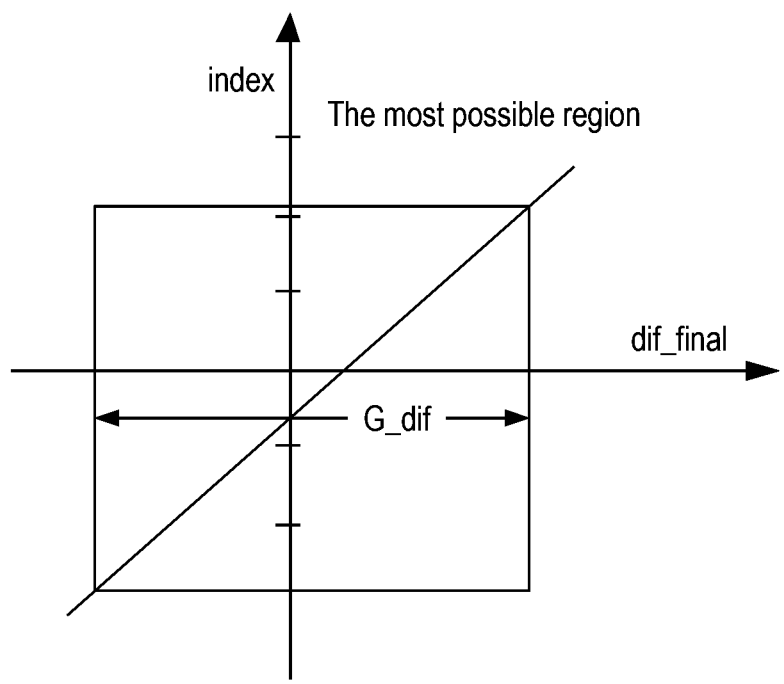
FIG. 7 is a schematic diagram of a mapping module according to the present invention.

The mapping module 153 is connected to the QP module 151 for calculating the index according to a final prediction difference value (dif_final) and the QP. In this embodiment, the final prediction difference value (dif_final) is the prediction difference value (dif). The mapping module 153 is expressed as follows:

$$\text{index}=\text{Map}(dif\_final)=dif\_final/S,$$

$$S=1<<QP,$$

where S represents a divisor defaulted to 1b (binary 1) and S=1<<QP represents that bit "1" of S is left shifted QP bits. Namely, when the QP is 2, bit "1" of S is left shifted 2 bits, and thus S=4 (=100b). FIG. 7 is a schematic diagram of the mapping module 153 according to the present invention. In FIG. 7, the horizontal coordinate indicates the final prediction difference value (dif_final), and the vertical coordinate indicates the index.

The QP module 151 is a function of the suggestion bits signal (suggest_bits) and the current history data (G_dif), and the quantization parameter (QP) is its output. When each pixel of the frame includes red, green, blue (R, G, B) colors, each block has a size of four pixels, and the number of the color pixels in the block is 12 (=3*4=12), the bit distribution (bpc) can be expressed as follows:

$$bpc=\text{suggest\_bits}/\text{Num\_value\_in\_Block},$$

where bpc represents the bit distribution, suggest_bits represents the suggestion bits signal, and Num_value_in_Block represents the number of color pixels in the block.

The quantization parameter (QP) can be expressed as follows:

$$QP=\text{BitSize}(G\_dif+A)-bpc,$$

where G_dif represents the current history data, bpc represents the bit distribution, A is a first predetermined value, BitSize(k) is a bit calculation function to calculate the number of bits required for an unsigned integer k. For example, for k=9 (=1001b), it requires four bits for representation, and thus BitSize(k) equals 4.

In other embodiments, the quantization parameter (QP) can also be expressed as follows:

$$QP=(bpc<4)?5:(G\_dif>40)?4:G\_dif/8,$$

where bpc represents the bit distribution, G_dif represents the current history data, ? is a conditional operator, d=a?b:c represents that d=b when a is true and d=c when a is not true. Namely, QP equals 5 when the bit distribution (bpc) is smaller than four, QP equals 4 when the bit distribution (bpc) is not smaller than four and the current history data (G_dif) is greater than 40; otherwise QP equals the current history data (G_dif) divided by 8.

In other embodiments, the quantization parameter (QP) can also be expressed as follows:

$$QP=(bpc>4)?QP\_old-1:(G\_dif>40)?QP\_old+1:QP\_old,$$

$$QP=\text{clip}(QP,\min\_QP,\max\_QP),$$

where bpc represents the bit distribution, G_dif represents the current history data, QP_old represents a previous quantization parameter, min_QP is a second predetermined value, max_QP is a third predetermined value, and ? is a conditional operator. Namely, QP equals QP_old−1 when the bit distribution (bpc) is greater than four, QP equals QP_old+1 when the bit distribution (bpc) is not greater than four and the current history data (G_dif) is greater than 40; otherwise QP equals QP_old. In addition, clip( ) is a clip operation, and QP=clip(QP, min_QP, max_QP) represents that QP is unchanged when its value falls in between min_QP and max_QP, QP equals max_QP when its value is greater than max_QP, and QP equals min_QP when its value is smaller than min_QP.

The encoding device 160 is connected to the mapping device 150 and the bit-rate control device 140 for performing a loseless coding on the index so as to output a bit stream (bs) and the final bits signal (final_bits).

In another embodiment, the loseless coding of the encoding device 160 may perform a dynamical allocation by means of a history data analysis. For example, when the encoding device 160 uses a Golomb Rice encoding to perform the loseless coding, the Golomb Rice encoding's mapping equation $x \rightarrow (q, r)$ can be expressed as $x=q*M+r$, where the parameter M can be predicted by a complexity outputted from the sensitive detection device 120. Namely, M is 4 when the image of the plurality of historical decoded pixels has a high complexity, and otherwise M is 2. In the above equation, x represents an input of the Golomb Rice encoding, i.e., the index in this case, and (q, r) represents an output of the Golomb Rice encoding, i.e., the bit stream (bs). For example, if we have q=3, r=2, and M=2, the bs output is a Mbit coding of q 0s, 1, and r, i.e., (000 1 10).

In a further embodiment, when the encoding device 160 uses a fixed-length encoding to perform the loseless coding, the suggestion bits signal (suggest_bits) outputted by the bit-rate control device 140 can be used to predict the number of bits required for the fixed-length encoding.

Figure 8:
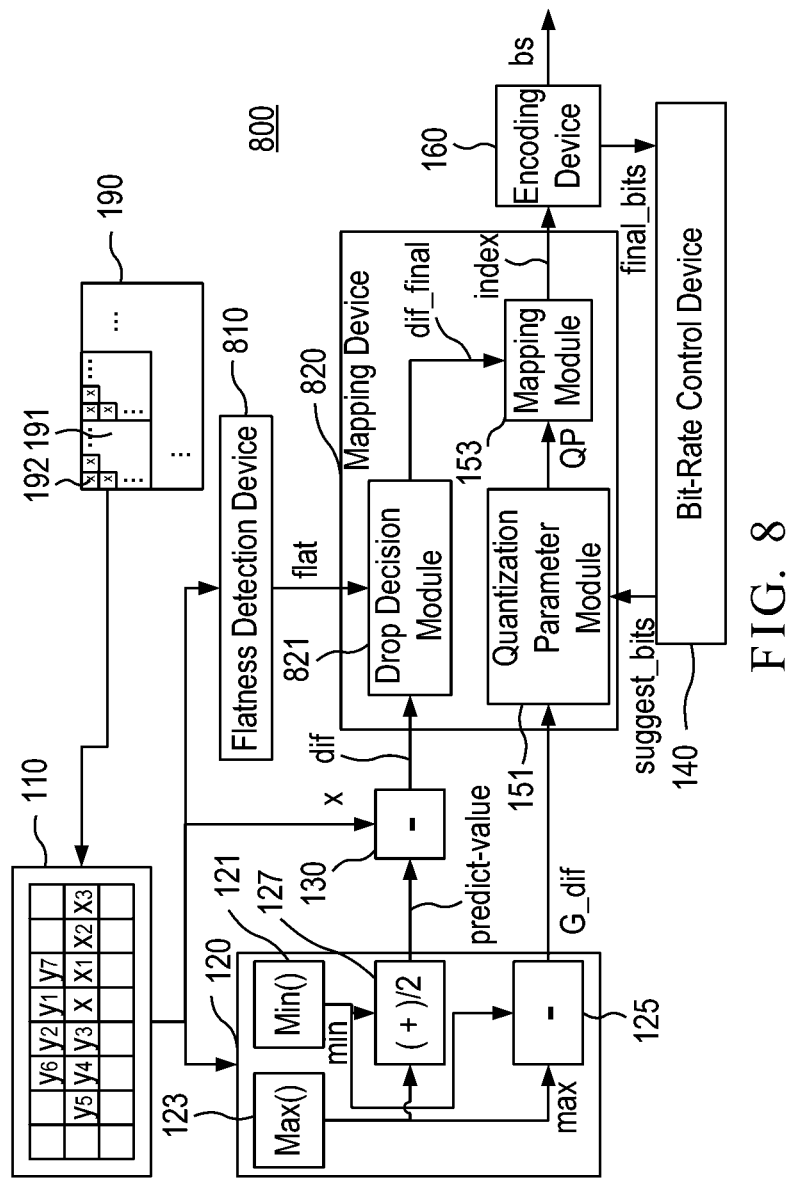
FIG. 8 is a block diagram of an image compression system for dynamically adjusting compression parameters by content sensitive detection in video signal according to another embodiment of the present invention.

FIG. 8 is a block diagram of an image compression system 800 for dynamically adjusting compression parameters by content sensitive detection in video signal according to another embodiment of the present invention, which is provided to encode a plurality of pixels of a frame. The image compression system 800 includes a register 110, a sensitive detection device 120, a prediction difference device 130, a bit-rate control device 140, an encoding device 160, a flatness detection device 810, and a mapping device 820. This embodiment is similar to that in FIG. 1 except that there are newly provided with the flatness detection device 810 and a drop decision module 821 in the mapping device 820.

The flatness detection device 810 is connected to the register 110 for calculating a flatness (flat) of the current encoding pixel (x) based on the current encoding pixel (x) and the first to third uncoded pixels (x1, x2, x3). The flatness (flat) can be expressed as follows:

$$\text{flat} = \max(\text{abs}(x-x1), \text{abs}(x1-x2), \text{abs}(x2-x3)),$$

where flat represents the flatness, x is the current encoding pixel, x1 is the first uncoded pixel, x2 is the second uncoded pixel, x3 is the third uncoded pixel, max( ) represents a maximum function, and abs( ) represents an absolute function.

The mapping device 820 includes the QP module 151, the mapping module 153, and a drop decision module 821. The functions of the QP module 151 and the mapping module 153 are depicted in the previous embodiment, and thus a detailed description therefor is deemed unnecessary. The drop decision module 821 can be expressed as follows:

```
if( dif<C && flat>D)
    dif_final = 0
else
    dif_final = dif,
``` where dif is the prediction difference value, flat represents the flatness, C is a fourth predetermined value, D is a fifth predetermined value, and dif_final is the final prediction difference value.

The image compression system 800 makes use of the flatness detection device 810 to update the final prediction difference value (dif_final) based on the uncoded pixel data so as to increase the total compression ratio under a reasonable image distortion. Namely, the drop decision module 821 is based on future data, i.e., the flatness, to fine adjust the final prediction difference value (dif_final). For example, the final prediction difference value (dif_final) is unchanged when the future region is very flat (flat<D), and final prediction difference value (dif_final) is 0 when the future region is not a flat region (flat>D).

With the newly provided flatness detection device 810, an encoded indicative signal for a block containing the current encoding pixel (x) can be calculated according to the current encoding pixel (x) and the uncoded pixels. Namely, with the result detected by the flatness detection device 810, a size of the flat block is recoded by two bits as a header encoded into the compressed bit stream (bs). FIG. 9 schematically illustrates the pseudo code of determining a block size according to the present invention. As shown in FIGS. 1 and 9, the first uncoded pixel (x1) is disposed at the right pixel position of the current encoding pixel (x), the second uncoded pixel (x2) is disposed at the second-to-right pixel position of the current encoding pixel (x), i.e., the right pixel position of the pixel (x1), the third uncoded pixel (x3) is disposed at the third-to-right pixel position of the current encoding pixel (x), i.e., the right pixel position of the pixel (x2), and so on. When (max(abs(X−X1), abs(X1−X2), . . . , abs(X15−X16))<TH) is true, it indicates that the difference between the uncoded pixels is small; i.e., the flatness is large, so that the encoded indicative signal contains "11b" to indicate a 16×1 block size in use. In this case, all pixels in the block size are decoded into the same pixel value for increasing the compression ratio. When (max(abs(X−X1), abs(X1−X2), . . . , abs(X7−X8))<TH) is true, it indicates that the difference between the uncoded pixels in a 8×1 block size is small, and thus the encoded indicative signal contains "10b" to indicate the 8×1 block size in use. Similarly, a 4×1 block size is used when the encoded indicative signal contains "01b", and a 1×1 block size is used when the encoded indicative signal contains "00b".

Figure 10:
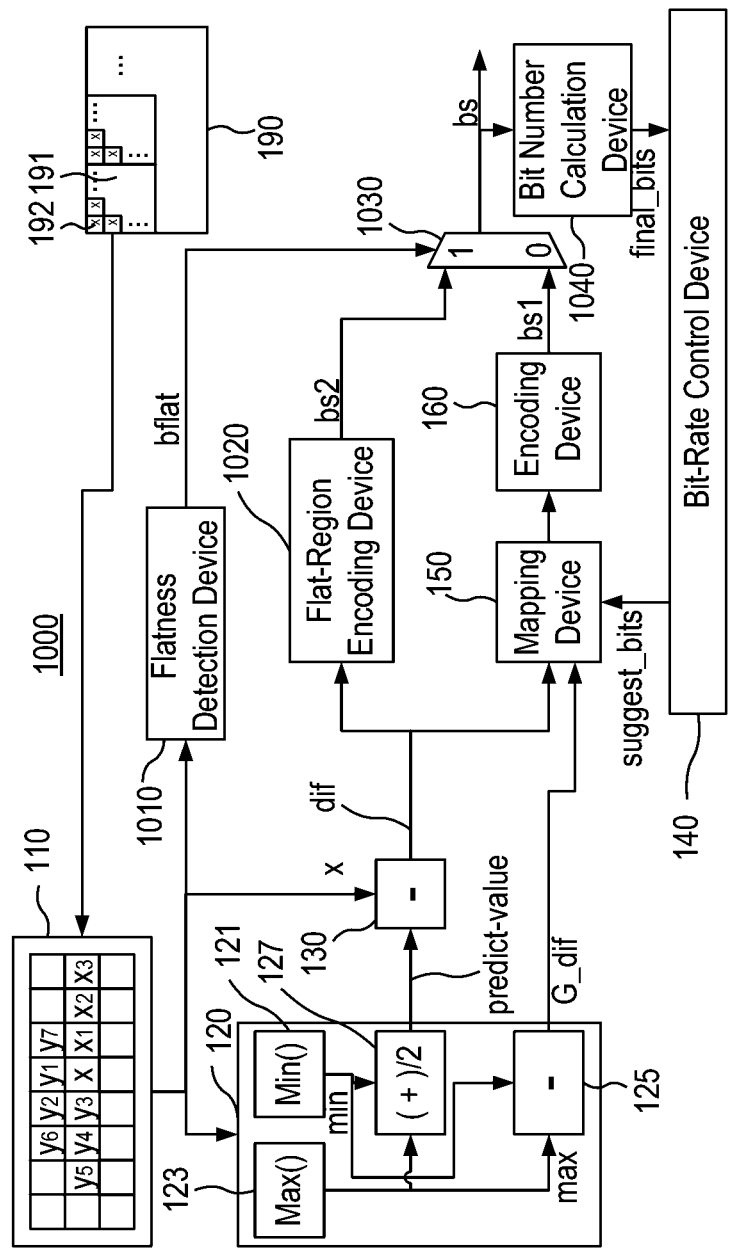
FIG. 10 is a block diagram of an image compression system for dynamically adjusting compression parameters by content sensitive detection in video signal according to a further embodiment of the invention.

FIG. 10 is a block diagram of an image compression system 1000 for dynamically adjusting compression parameters by content sensitive detection in video signal according to a further embodiment of the present invention, which os provided to encode plural pixels of a frame. The system 1000 includes a register 110, a sensitive detection device 120, a prediction difference device 130, a bit-rate control device 140, a mapping device 150, an encoding device 160, a flatness detection device 1010, a flat-region encoding device 1020, a multiplexer 1030, and a bit number calculation device 1040.

The functions of the sensitive detection device 120, the prediction difference device 130, the bit-rate control device 140, the mapping device 150, and the encoding device 160 are the same as those of FIG. 1, and thus a detailed description therefor is deemed unnecessary.

The flatness detection device 1010 is connected to the register 110 for calculating a flatness (flat) of the current encoding pixel (x) and a flatness indicative signal (bflat) based on the current encoding pixel (x) and the first to third uncoded pixels (x1, x2, x3).

The flatness (flat) and the flatness indicative signal (bflat) can be expressed as follows:

flat=max(abs($x$–$x1$),abs($x1$–$x2$),abs($x2$–$x3$)), $b$flat=(flat<4), where flat represents the flatness, x is the current encoding pixel, x1 is the first uncoded pixel, x2 is the second uncoded pixel, x3 is the third uncoded pixel, max( ) represents a maximum function, and abs( ) represents an absolute function. When the flatness (flat) is smaller than four, i.e., flat<4 being true, it indicates a strong possibility for the region to be a flat region, and thus the flatness indicative signal (bflat) is 1 to indicate that the region is a flat region. On the contrary, when the flatness (flat) is not smaller than four, i.e., flat<4 being false, it indicates a weak possibility for the region to be a flat region, and thus the flatness indicative signal (bflat) is 0 to indicate that the region is not a flat region.

The flat-region encoding device 1020 is connected to the prediction difference device 130 for calculating and outputting a second bit stream (bs2) based on a predetermined quantization parameter (QP) and the prediction difference value (dif). FIG. 10 is provided to subdivide the encoding function of FIG. 1 and determine a first bit stream (bs1) outputted by the encoding device 150 or a second bit stream (bs2) outputted by the flat-region encoding device 1020 in use according to the flatness indicative signal (bflat) outputted by the flatness detection device 1010.

The flat-region encoding device 1020 is specially designed for a flat-region block compression, while the mapping device 150 and the encoding device 160 are provided to execute a general compression function. The flat-region encoding device 1020 can be a run-length encoding device or a fixed-length encoding device. Since the flat-region encoding device 1020 is specially provided for the flat-region block compression, the compression efficiency is better than that of the mapping device 150 or the encoding device 160. In this case, there are two bit streams, so that an additional header data has to be added in front of the compressed stream for ensuring the compression/decompression accuracy.

The flat-region encoding device 1020 only uses a small quantization parameter (QP). For example, when one block includes four pixels, the QP includes four elements (QP[0], QP[1], QP[2], QP[3]), which are [0, 1, 2, 2] respectively. FIG. 11 schematically illustrates the functional pseudo code of the flat-region encoding device 1020 according to the present invention. As shown in FIG. 11, since one block includes four pixels, the flat-region encoding device 1020 divides the four prediction difference values (dif0, dif1, dif2, dif3) by first to fourth values, respectively, so as to generate first to fourth indexes (index0, index1, index2, index3), where the first value is 2^QP[0], the second value is 2^QP[1], the third value is 2^QP[2], and the fourth value is 2^QP[3], for A indicates a power operation, i.e., 2^1=2, 2^2=4, 2^3=8, and so on.

Then, the flat-region encoding device 1020 uses a three-bit fixed-length encoding to encode the first to fourth indexes (index0, index1, index2, index3). Since the block is a flat region, the three-bit fixed-length encoding can encode the first to fourth indexes (index0, index1, index2, index3) into the second bit stream (bs2) without distortion.

The multiplexer 1030 is connected to the encoding device 160, the flatness detection device 1010, and the flat-region encoding device 1020 for selecting one of the first bit stream (bs1) and the second bit stream (bs2) for output. The bit number calculation device 1040 is connected to the multiplexer 1030 and the bit-rate control device 140 for calculating a final bits signal (final_bits) according to a bit stream (bs) outputted by the multiplexer 1030.

FIG. 12 schematically illustrates the bit stream (bs) outputted by the multiplexer 1030 according to the present invention. As shown in FIG. 12, when the flatness indicative signal (bflat) equals zero, it indicates that the region is not a flat region, and thus the multiplexer 1030 selects the first bit stream (bs1) for output. When the flatness indicative signal (bflat) equals one, it indicates that the region is a flat region, and thus the multiplexer 1030 selects the second bit stream (bs2) for output.

In other embodiments, the flatness indicative signal (bflat) is regarded as a skip mode indicative signal. That is, the image compression system 1000 only encodes the flatness indicative signal (bflat) and repeatedly writes a previous pixel (y3), i.e., the third historical decoded pixel (y3) in each pixel of the block directly. FIG. 13 schematically illustrates the output bit stream (bs) of the multiplexer 1030 according to the present invention. As shown in FIG. 13, when the flatness indicative signal (bflat) equals zero, it indicates that the region is not a flat region, and thus the multiplexer 1030 selects the first bit stream (bs1) for output. When the flatness indicative signal (bflat) equals one, it indicates that the region is a flat region, and thus the subsequent bits are not encoded compression data. When the flatness indicative signal (bflat) read by a receiver from the bit stream (bs) is one, it indicates that the subsequent bits are not encoded compression data, and thus the third historical decoded pixel (y3) previously decoded is repeatedly written in.

As cite, the present invention is able to fine adjust the final prediction difference value (dif_final) based on the future data (the flatness). Since the prediction error in a complicated region is decreased, the number of bits required for compression is reduced. In addition, the prediction error in a flat region is remained, and thus the compression quality of the flat region is increased. For example, reduction of error is achieved by setting the final prediction difference value (dif_final) to zero, so that the subsequent loseless compression has a higher efficiency because the possibility of occurrence of index==0 is relatively increased. In addition, the invention makes use of the sensitive detection device 120 to perform a texture content detection on an image so as to automatically adjust the parameters required for compression, or switch to a more efficient encoding module, according to the texture detection messages.

In view of the foregoing, it is known that the present invention makes use of the history data generated in a previous compression to predict the parameters without requiring any complicated operation, so as to increase the compression efficiency without adding extra bits, and save operations without using a large block (16×16) data analysis thereby reducing the associated data stream and time delay. Since the delay required for a compression unit becomes smaller, the present invention is more suitable for an application of real-time compression/decompression.

Although the present invention has been explained in relation to its preferred embodiment, it is to be understood that many other possible modifications and variations can be made without departing from the spirit and scope of the invention as hereinafter claimed.

What is claimed is:

1. An image compression system having an image processor for dynamically adjusting compression parameters by content sensitive detection in video signal, which encodes a plurality of pixels of a frame, the image compression system comprising:
- a register implemented in the image processor for temporarily storing the plurality of pixels of the frame, wherein the plurality of pixels have a current pixel to be encoded and a plurality of reference pixels;
- a sensitive detection device implemented in the image processor and connected to the register for analyzing contents of the plurality of reference pixels so as to calculate a prediction value and a current history data for output, wherein the current history data represents image complexity of the plurality of reference pixels;
- a prediction difference device implemented in the image processor and connected to the sensitive detection device for subtracting the prediction value from the current pixel to be encoded so as to generate a prediction difference value for output;
- a bit-rate control device implemented in the image processor for adjusting a compression ratio according to a final bit number signal so as to output a bit number suggestion signal, wherein the final bit number signal represents a final bitrate of a bit stream;
- a mapping device implemented in the image processor and connected to the sensitive detection device, the prediction difference device, and the bit-rate control device for outputting an index based on the prediction difference value, the current history data, and the bit number suggestion signal; and
- an encoding device implemented in the image processor and connected to the mapping device and the bit-rate control device for encoding the index so as to output the bit stream and the final bit number signal, wherein the mapping device includes:
- a quantization parameter module implemented in the image processor and connected to the sensitive detection device and the bit-rate control device for calculating a bit distribution based on the suggestion bits number signal and a number of color pixels in a block containing the current pixel to be encoded and further calculating a quantization parameter based on the current history data and the bit distribution; and
- a mapping module implemented in the image processor and connected to the quantization parameter module for calculating the index based on a final prediction difference value and the quantization parameter, wherein the mapping device is expressed as:

index=Map(dif_final)=dif_final/$S$, $S=1<<QP$, where dif_final represents the final prediction difference value, S represents a divisor defaulted to 1b and $S=1<<QP$ represents that bit "1" of S is left shifted QP bits, and QP is the quantization parameter.

2. The image compression system as claimed in claim 1, wherein the sensitive detection device includes:
- a minimum value module implemented in the image processor and connected to the register for receiving the plurality of reference pixels, determining a minimum one from the reference pixels that serves as a minimum value, and outputting the minimum value of the plurality of reference pixels;
- a maximum value module implemented in the image processor and connected to the register for receiving the plurality of reference pixels, determining a maximum one from the reference pixels that serves as a maximum value, and outputting the maximum value of the plurality of reference pixels;
- a difference value module implemented in the image processor and connected to the minimum value module and the maximum value module for calculating a difference value of the minimum value and the maximum value by subtracting the minimum value from the maximum value so as to generate the current history data; and
- an average value module implemented in the image processor and connected to the minimum value module and the maximum value module for calculating an average value of the minimum value and the maximum value by dividing a sum of the minimum value and the maximum value by two so as to generate the prediction value.

3. The image compression system as claimed in claim 1, wherein the sensitive detection device includes:
- a median value module implemented in the image processor and connected to the register for receiving the plurality of reference pixels, calculating a median from the reference pixels that serves as a median value, and outputting the median value of the plurality of reference pixels;
- an extrapolation module implemented in the image processor and connected to the register for receiving the plurality of reference pixels, performing an extrapolation on the reference pixels to obtain an extrapolation value, and outputting the extrapolation value of the plurality of reference pixels;
- a mode module implemented in the image processor and connected to the register for receiving the plurality of reference pixels and outputting a mode of the plurality of reference pixels, wherein the mode of the plurality of reference pixels is one of the reference pixels that occurs most often in the plurality of reference pixels;
- a prediction value selection module implemented in the image processor and connected to the median value module, the extrapolation module, and the mode module for selecting one of the median value, the extrapolation value, and the mode as the prediction value;
- a minimum value module implemented in the image processor and connected to the register for receiving the plurality of reference pixels, determining a minimum one from the reference pixels that serves as a minimum value, and outputting the minimum value of the plurality of reference pixels;
- a maximum value module implemented in the image processor and connected to the register for receiving the plurality of reference pixels, determining a maximum one from the reference pixels that serves as a maximum value, and outputting the maximum value of the plurality of reference pixels; and
- a difference value module implemented in the image processor and connected to the minimum value module and the maximum value module for calculating a difference value of the minimum value and the maximum value by subtracting the minimum value from the maximum value so as to generate the current history data.

4. The image compression system as claimed in claim 3, wherein the plurality of reference pixels include first to fifth reference pixels in history, the first reference pixel being disposed at an upper pixel position of the current pixel to be encoded, the second reference pixel being disposed at an upper left pixel position of the current pixel to be encoded, the third reference pixel being disposed at a left pixel position of the current pixel to be encoded, the fourth reference pixel being disposed at a second-to-left pixel position of the current pixel to be encoded, the fifth reference pixel being disposed at a third-to-left pixel position of the current pixel to be encoded, such that the sensitive detection device includes:
- the median value module implemented in the image processor and connected to the register for receiving the first to third reference pixels and outputting a median value of the first to third reference pixels;
- the extrapolation module implemented in the image processor and connected to the register for receiving the third to fifth reference pixels and outputting an extrapolation value of the third to fifth reference pixels;
- the mode module implemented in the image processor and connected to the register for receiving the first to fifth reference pixels and outputting a mode of the first to fifth reference pixels;
- the prediction value selection module implemented in the image processor and connected to the median value module, the extrapolation module, and the mode module for selecting one of the median value, the extrapolation value, and the mode as the prediction value;
- the minimum value module implemented in the image processor and connected to the register for receiving the first to fifth reference pixels and outputting the minimum value of the first to fifth reference pixels;
- the maximum value module implemented in the image processor and connected to the register for receiving the first to fifth reference pixels and outputting the maximum value of the first to fifth reference pixels; and
- the difference value module implemented in the image processor and connected to the minimum value module and the maximum value module for calculating the difference value of the minimum value and the maximum value so as to generate the current history data.

5. The image compression system as claimed in claim 4, wherein the prediction value selection module selects the extrapolation value as the prediction value when an absolute value of subtracting the third reference pixel and the fifth reference pixel from a double of the fourth reference pixel is smaller than a first threshold, and selects the mode as the prediction value when a maximum one from an absolute value of subtracting the second reference pixel from the first reference pixel, an absolute value of subtracting the third reference pixel from the second reference pixel, and an absolute value of subtracting the fourth reference pixel from the third reference pixel is greater than a second threshold; otherwise the median value is selected as the prediction value.

6. The image compression system as claimed in claim 1, wherein the sensitive detection device includes a plurality of edge detection modules implemented in the image processor to generate a plurality of edge values for predicting the prediction value, wherein each edge detection module generates an edge value by calculating an absolute value of a difference between two neighboring reference pixels.

7. The image compression system as claimed in claim 6, wherein the plurality of reference pixels includes first to seventh reference pixels, the first reference pixel being disposed at an upper pixel position of the current pixel to be encoded, the second reference pixel being disposed at an upper left pixel position of the current pixel to be encoded, the third reference pixel being disposed at a left pixel position of the current pixel to be encoded, the fourth reference pixel being disposed at a second-to-left pixel position of the current pixel to be encoded, the fifth reference pixel being disposed at a third-to-left pixel position of the current pixel to be encoded, the sixth reference pixel being disposed at an upper second-to-left pixel position of the current pixel to be encoded, the seventh reference pixel being disposed at an upper right pixel position of the current pixel to be encoded, such that the sensitive detection device includes:
- a first edge detection module implemented in the image processor and connected to the register for receiving the second and the third reference pixels so as to calculate an absolute value of a difference between the second and the third reference pixels for output as a first edge value;
- a second edge detection module implemented in the image processor and connected to the register for receiving the third and the sixth reference pixels so as to calculate an absolute value of a difference between the third and the sixth reference pixels for output as a second edge value;
- a third edge detection module implemented in the image processor and connected to the register for receiving the first and the third reference pixels so as to calculate an absolute value of a difference between the first and the third historical pixels for output as a third edge value;
- a prediction value selection module implemented in the image processor and connected the first edge detection module, the second edge detection module, and the third edge detection module for selecting one of the second reference pixel, the seventh reference pixel, and the first reference pixel as the prediction value based on the first edge value, the second edge value, and the third edge value;
- a minimum value module implemented in the image processor and connected to the register for receiving the first to seventh reference pixels, determining a minimum one from the first to seventh reference pixels that serves as a minimum value, and outputting the minimum value of the first to seventh reference pixels;
- a maximum value module implemented in the image processor and connected to the register for receiving the first to seventh reference pixels, determining a maximum one from the first to seventh reference pixels that serves as a maximum value, and outputting the maximum value of the first to seventh reference pixels; and
- a difference value module implemented in the image processor and connected to the minimum value module and the maximum value module for calculating a difference value of the minimum value and the maximum value by subtracting the minimum value from the maximum value so as to generate the current history data.

8. The image compression system as claimed in claim 7, wherein the prediction value selection module selects the second reference pixel as the predication value when the second edge value is smaller than the first edge value and the third edge value, and selects the seventh reference pixel as the predication value when the third edge value is smaller than the first edge value; otherwise the first reference pixel is selected as the predication value.

9. The image compression system as claimed in claim 1, wherein the bit distribution is expressed as:

$$bpc = suggest\_bits / Num\_value\_in\_block,$$

where bpc represents the bit distribution, suggest_bits represents the bit number suggestion signal, and the Num_value_in_Block represents the number of color pixels in the block.

10. The image compression system as claimed in claim 9, wherein relation of the quantization parameter, the current history data and the bit distribution is expressed as:

$$QP = \text{BitSize}(G\_dif + A) - bpc,$$

where G_dif represent the current history data, bpc represents the bit distribution, A is a first predetermined value, BitSize(k) is a bit calculation function to calculate a number of bits required for an unsigned integer k.

11. The image compression system as claimed in claim 9, wherein relation of the quantization parameter, the current history data and the bit distribution is expressed as:

if($bpc<4$)

$Qp=5;$ else if ($G\_dif>40$)

$Qp=4;$ otherwise $Qp=G\_dif/8,$ where bpc represents the bit distribution, G_dif represents the current history data, ? is a conditional operator, d=a?b:c represents that d=b when a is true and d=c when a is not true.

12. The image compression system as claimed in claim 9, wherein relation of the quantization parameter, the current history data and the bit distribution is expressed as:

if($bpc<4$)

$Qp=QP\_old-1;$ else if ($G\_dif>40$)

$Qp=QP\_old+1;$ otherwise $Qp=QP\_old,$ $$QP = \text{clip}(QP, \min\_QP, \max\_QP),$$

where bpc represents the bit distribution, G_dif represents the current history data, QP_old represents a previous quantization parameter, min_QP is a second predetermined value, max_QP is a third predetermined value, ? is a conditional operator, d=a?b:c represents that d=b when a is true and d=c when a is not true, clip( ) represents a clip operator, QP is unchanged when its value falls in between min_QP and max_QP, QP equals max_QP when its value is greater than max_QP, and QP equals min_QP when its value is smaller than min_QP.

13. The image compression system as claimed in claim 1, wherein the register further includes a plurality of uncoded pixels having first to third uncoded pixels, the first uncoded pixel being disposed at a right pixel position of the current pixel to be encoded, the second uncoded pixel being disposed at a second-to-right pixel position of the current pixel to be encoded, the third uncoded pixel being disposed at a third-to-right pixel position of the current pixel to be encoded.

14. The image compression system as claimed in claim 13, further comprising:
a flatness detection device implemented in the image processor and connected to the register for calculating a flatness of the current pixel to be encoded based on the current pixel to be encoded and the first to third uncoded pixels, wherein the flatness represents a variance of the uncoded pixels and is expressed as:

$$\text{flat} = \max(\text{abs}(x-x1), \text{abs}(x1-x2), \text{abs}(x2-x3)),$$

where flat is the flatness, x is the current pixel to be encoded, x1 is the first uncoded pixel, x2 is the second uncoded pixel, x3 is the third uncoded pixel, max( ) is a maximum function, and abs( ) is an absolute function.

15. The image compression system as claimed in claim 14, wherein the flatness detection device is based on the current pixel to be encoded and the plurality of uncoded pixels to calculate an encoded indicative signal for a block containing the current pixel to be encoded, and wherein the block has a size of 16×1 when the encoded indicative signal contains a value of 11b, a size of 8×1 when the encoded indicative signal contains a value of 10b, a size of 4×1 when the encoded indicative signal contains a value of 01b, and a size of 1×1 when the encoded indicative signal contains a value of 00b.

16. The image compression system as claimed in claim 14, wherein the mapping device includes:
a drop decision module implemented in the image processor and connected to the predication difference device and the flatness detection device for generating a final prediction difference value based on the flatness and the prediction difference value;
a quantization parameter module implemented in the image processor and connected to the sensitive detection device and the bit-rate control device for calculating a bit distribution based on the bit number suggestion signal and a number of color pixels in a block containing the current pixel to be encoded and further calculating a quantization parameter based on the current history data and the bit distribution; and
a mapping module implemented in the image processor and connected to the quantization parameter module for calculating the index based on the final prediction difference value and the quantization parameter.

17. The image compression system as claimed in claim 16, wherein the drop decision module uses a future flatness data and a prediction error to decide a final number in encoding, which is expressed as:

```
if( dif<C && flat>D)
    dif_final = 0
else
    dif_final = dif,
``` where dif represents the prediction difference value, flat represents the flatness, C is a fourth predetermined value, D is a fifth predetermined value, and dif_final represents the final prediction difference value.

18. An image compression system having an image processor for dynamically adjusting compression parameters by content sensitive detection in video signal, which encodes a plurality of pixels of a frame, the image compression system comprising:

a register implemented in the image processor for temporarily storing the plurality of pixels of the frame, the plurality of pixels having a current pixel to be encoded, a plurality of reference pixels, and a plurality of uncoded pixels;

a sensitive detection device implemented in the image processor and connected to the register for detecting contents of the plurality of reference pixels so as to calculate a prediction value and a current history data for output;

a prediction difference device implemented in the image processor and connected to the sensitive detection device for subtracting the prediction value from the current pixel to be encoded so as to generate a prediction difference value for output;

a bit-rate control device implemented in the image processor and for adjusting a compression ratio according to a final bit number signal so as to output a bit number suggestion signal, wherein the final bit number signal represents a final bitrate of a bit stream;

a mapping device implemented in the image processor and connected to the sensitive detection device, the prediction difference device, and the bit-rate control device for calculating and outputting an index based on the current history data, the prediction difference value, and the bit number suggestion signal;

an encoding device implemented in the image processor and connected to the mapping device and the bit-rate control device for encoding the index for outputting a first bit stream;

a flatness detection device implemented in the image processor and connected to the register for calculating a flatness of the current pixel to be encoded and a flatness indicative signal based on the current pixel to be encoded and the plurality of uncoded pixels;

a flat-region encoding device implemented in the image processor and connected to the prediction difference device for calculating and outputting a second bit stream based on a predetermined quantization parameter and the prediction difference value; and a multiplexer implemented in the image processor and connected to the encoding device, the flatness detection device, and the flat-region encoding device for selecting one of the first and the second bit streams for output, wherein the mapping device is expressed as:

index=Map(dif_final)=dif_final/$S$, $S$=1<<$QP$, where dif_final represents the final prediction difference value, S represents a divisor defaulted to 1b and S=1<<QP represents that bit "1" of S is left shifted QP bits, and QP is the predetermined quantization parameter.

19. The image compression system as claimed in claim 18, further comprising:

a bit number calculation device implemented in the image processor and connected to the multiplexer and the bit-rate control device for calculating the final bits number signal according to a bit stream outputted by the multiplexer.

20. The image compression system as claimed in claim 19, wherein, for the bit stream outputted by the multiplexer, when the flatness indicative signal is 0b, it indicates that a next bit stream following the bit stream is regarded as the first bit stream, and when the flatness indicative signal is 1b, it indicates that a next bit stream following the bit stream is regarded as the second bit stream.

21. The image compression system as claimed in claim 20, wherein, for the bit stream outputted by the multiplexer, when the flatness indicative signal is 0b, it indicates that a next bit stream following the bit stream is regarded as the first bit stream, and when the flatness indicative signal is 1b, it indicates that a next bit stream following the bit stream is not an encoded compression data.

* * * * *